United States Patent [19]
Heckenkamp

[11] 3,853,335
[45] Dec. 10, 1974

[54] DRAFT ARM LATCH ASSEMBLY
[75] Inventor: Edward B. Heckenkamp, Brookfield, Wis.
[73] Assignee: Allis-Chalmers Corporation, Milwaukee, Wis.
[22] Filed: Oct. 29, 1973
[21] Appl. No.: 410,907

[52] U.S. Cl.......... 280/478 R, 280/461 A, 172/272, 172/439
[51] Int. Cl............................................... B60d 1/00
[58] Field of Search............ 280/478 R, 478 B, 477, 280/461 A; 172/272, 439

[56] References Cited
UNITED STATES PATENTS
2,795,178 6/1957 Silver et al..................... 172/272 X
2,820,649 1/1958 Demarest........................ 280/478 B
2,871,029 1/1959 Demarest............................ 280/477
3,643,976 2/1972 Haupt et al...................... 280/478 R Primary Examiner—Leo Friaglia
Attorney, Agent, or Firm—Arthur L. Nelson

[57] ABSTRACT

A draft arm latch assembly for a draft vehicle to selectively engage or disengage an extension link on the draft arm to allow for two positions of the link in the lower draft arm and provide the means to facilitate hitching of an implement to the draft vehicle.

10 Claims, 5 Drawing Figures

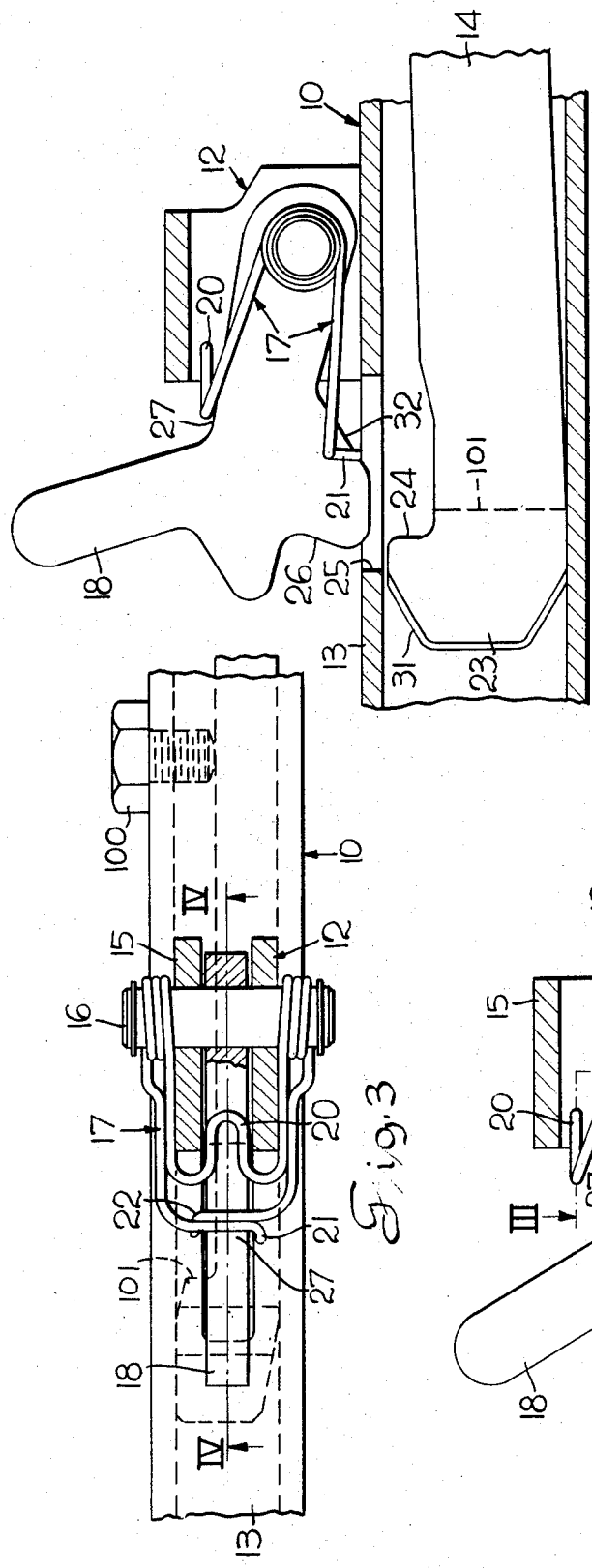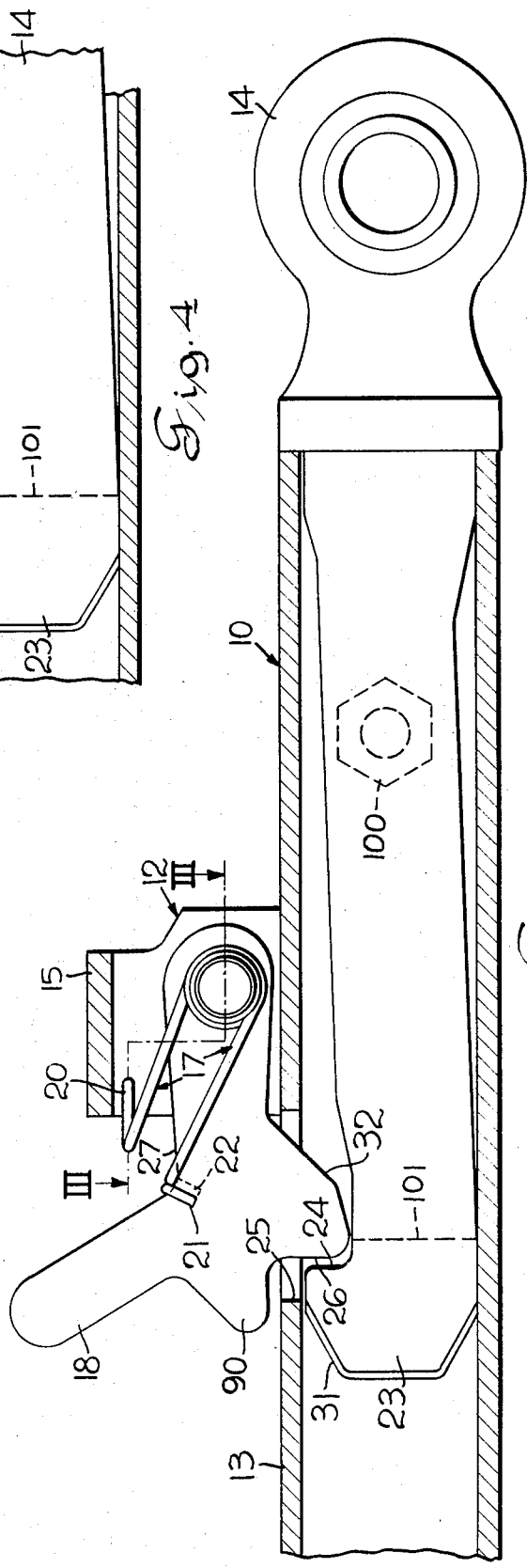

DRAFT ARM LATCH ASSEMBLY

This invention relates to a draft arm on a draft vehicle and more particularly to a latch assembly for the draft arm to provide a latched position and unlatched position of an extension link slidably positioned in the lower draft arm.

A three-point hitch on a tractor includes two lower draft arms and an upper link for coupling the tractor to the implement. The lower draft arms are connected to the implement and carry the draft load on the implement. An extensible draft arm assembly generally consists of a pair of telescoping draft links with the inner member being connected to the implement while the outer member is connected to the tractor. The inner member is normally nonrotatable in the outer member with a locking pin extending through an opening in the outer member to engage a hook portion in the inner member when the extensible draft arm assembly is fully retracted thereby locking the members together. The use of draft arm extensions on the lower draft arm is a convenience since the position of the tractor is not so critical because the draft arm extension can be moved longitudinally, and transversely for a limited amount to accommodate the coupling of the tractor and implement.

A latch assembly carried on the lower draft arm assembly ordinarily is biased to a normally latched position with the extension link in the lower draft arm. The spring biasing the latch element to an engaging position with the extension link normally retains the latch element in this position, and the engaging surfaces are such that there is no component of force to disengage the latch element and release the extension link. It is, however, at times necessary to disengage the latch and allow the extension link to extend relative to the draft arm. Accordingly, a means must be provided to temporarily retain the latching element in a disengaging position from the extension link when the lower draft arm assembly is extended.

Accordingly, this invention provides for an improved latch on the lower draft arm assembly to selectively engage and disengage an extension link in the draft arm. A resilient means biases a latch element to engagement with the extension link when the link is in the retracted position within the draft arm. Similarly, the resilient member can be repositioned to temporarily retain the latch element in a disengaged position with the extension link and thereby permit extension of the draft arm assembly.

Accordingly, it is the object of this invention to provide a latch on a draft arm assembly to selectively latch the extension member in a retracted position in the lower draft arm assembly.

It is a further object of this invention to provide a latch on a draft arm assembly for selectively engaging and disengaging of a draft arm extension providing a two-position length of the draft arm assembly.

It is a further object of this invention to provide a latch on a draft arm assembly having a spring detent for selectively positioning a latch element in a latched position for contracting the latch arm assembly and an unlatched position permitting extension of the draft arm assembly.

The objects of this invention are accomplished by providing a latch assembly mounted on the lower draft arm assembly. The draft arm and extension link are telescopingly positioned relative to each other to permit two positions of the draft arm assembly. The extension link reciprocates within the draft arm and has a hook for engagement with a latch element which is normally biased to an engaging position to retain the draft arm assembly in its retracted position. A resilient means normally biasing the latch to the engaging position can be repositioned to temporarily retain the latch element in a disengaged position to allow the draft arm assembly to extend to its normally extended position.

The preferred embodiment of this invention is illustrated in the attached drawings.

FIG. 3 is a cross section view taken on line III—III of FIG. 5.

FIG. 4 is a cross section view taken on line IV—IV of FIG. 3 showing the latch in the unlatched position.

FIG. 5 is a cross section view similar to FIG. 4 except the latch is in the latched position.

Figure 1:
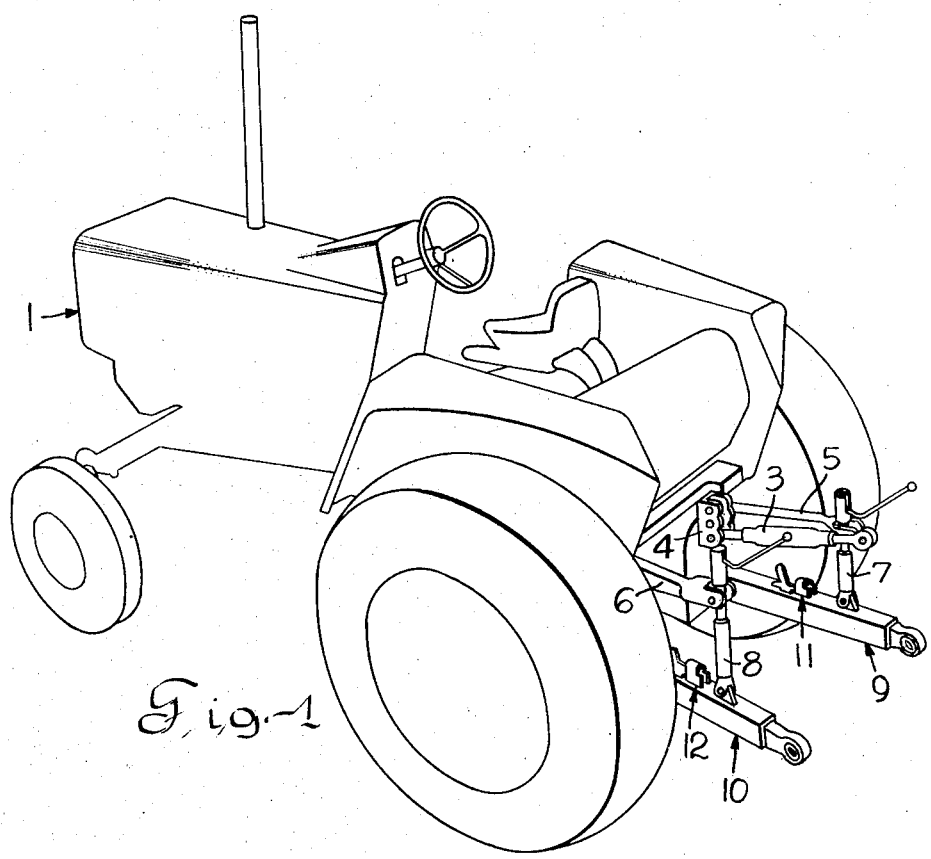
FIG. 1 illustrates a three-dimensional view of the tractor with a three-point hitch showing the latch on each of the lower draft arm assemblies.

Referring to the drawings FIG. 1 illustrates a tractor 1 on which the three-point hitch is mounted. The three-point hitch includes the upper link 3 mounted on the bracket 4 which is supported on rear end housing of tractor 1. The rock shaft (not shown) is connected to the rock arms 5 and 6. The rock arms 5 and 6 are connected to the lift links 7 and 8, respectively. The lift link 7 is connected to the lower draft arm assembly 9 while the lift link 8 is connected to the lower draft arm assembly 10. As the rock shaft is pivoted the rock arms 5 and 6 lift the lower draft arm assemblies 9 and 10 through the respective links 7 and 8.

Figure 2:
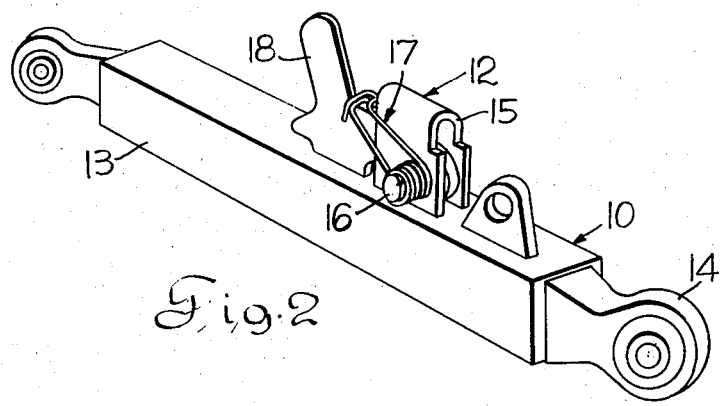
FIG. 2 is a three-dimensional view of the lower draft arm assembly including the latch.

Each of the lower draft arm assemblies include a latch assembly. Lower draft arm assembly 9 includes a latch 11 while the lower draft arm assembly 10 includes a latch assembly 12. Since the lower draft arm assembly 9 and the latch 11 are symmetrical with the lower draft arm assembly 10 and latch 12 only one of the draft arm assemblies will be described. Accordingly, the lower draft arm assembly 10 is shown in FIG. 2. The lower draft arm assembly 10 includes the draft arm 13 and the extension link 14 which telescopes within draft arm 13. A latch assembly 12 is mounted on the top of the lower draft arm 13. The latch assembly 12 includes the latch housing 15 in which a pin 16 is rotatably supported. The pin 16 carries the spring 17 which biases the latch element 18 to a latched position. The latch assembly is illustrated in detail in FIGS. 3, 4 and 5.

Referring to FIG. 3, the latch housing 15 is shown supporting the pin 16. A spring 17 is shown coiled around each end of the pin 16 with a reaction end loop 20 of the spring 17 seated within the housing 15. The latch operating ends of the spring 17 form two prongs 21 and 22. Each of the prong ends are positioned on the top of the latch element 18 with the downwardly extending prongs extending over the latch element to maintain it in this position when in operation on the latch element 18. The latch element 18 is normally biased in a downward position as shown in FIG. 5.

The extension link 14 is in the retracted position as shown in FIG. 5. The extension link 14 forms a hook 23 forming a substantially vertical surface 24. It is understood that the surface 24, although substantially vertical, may be inclined slightly rearward to maintain the latch element 18 in the latched position. In other words, the inclination should not be forward as this may produce a tendency to unlatch the latch element 18.

The lower draft arm 13 forms an opening 25 to receive the latch element 18. When the draft arm assembly 10 is in the retracted position as shown, the hook 23 of the extension link 14 engages the latching surface 26 of the latch element 18. Prong ends of the spring are shown seated on the top side of the latch element 18 and the spring biases the latch element to the downward position maintaining the latch in the latched position. If extension link 14 were extended the rest portion 90 of latch element 18 would reset on draft arm 13 adjacent opening 25.

FIG. 4 illlustrates the latch in the unlatched position permitting the extension link 14 to extend from the lower draft arm 13. The spring 17 is shown with the prongs 21 and 22 removed from the spring seat 27 and positioned against the side of the latch element 18. In this position the prongs 21 and 22 of the spring 17 frictionally engage the latch element 18 to maintain the latch element 18 in the unlatched position. Both of the prongs 21 and 22 may be removed and placed against the side of the latch element to hold the latch element open. However, repositioning of one of the ends of the spring will maintain the latch open. When the draft arm assembly is in the extended position bolt 100 engages the lug 101 on the side of the hook 23 on extension link 14.

The operation of the latch assembly will be described in the following paragraphs.

Lower draft arms 9 and 10 may be operated in either the contracted position as shown in FIGS. 1 and 2 or in an extended position in which the extension link 14 is extended. Normally the vehicle is operated with the latch in the latched position and the lower draft arm assemblies 9 and 10 in their contracted position. The extension of the extension link 14 relative to the lower draft arm 13 is usually done when the implement is being coupled to the tractor. This permits movement of the end of the lower draft arm assembly 10 to permit some lateral movement as well as longitudinal movement to facilitate coupling of the implement. When the implement is coupled to the tractor the tractor can be backed sufficiently to cause the latch assembly 12 to latch the lower draft arm assemblies in a retracted position.

When the lower draft arm assembly is to be extended the prongs 21 or 22 of the spring are removed from their seat 27 on the latch element 18. The prongs 21 and 22 of the spring as shown in FIG. 4 are then positioned against the side of the latch element to frictionally engage the side surfaces of the latch element. The friction is sufficient to hold the latch element in a position as shown in FIG. 4. The extension 14 can then be extended either manually without the implement attached, or as the tractor is moved ahead relative to the implement with the implement attached. Normally, however, the extension link 14 is manually extended to facilitate coupling of the vehicle.

When the operator desires to contract the draft arm assembly 10 the spring ends are repositioned on its spring seat 27. Repositioning the spring ends on the spring seat 27 of latch element 18 bias the latch element 18 downwardly in the position shown in FIG. 5.

When the extension link 14 is moved forwardly, a beveled surface 31 rides under the inclined surface 32 of latch element 18 lifting the latch element 18 and allowing the hook 23 to slide forwardly of the latching surface 26 of the latch element 18. Spring 17 then biases the latch element 18 downward to a latching position as shown in FIG. 5.

The embodiments of the invention in which an exclusive property or privilege is claimed are defined as follows:

1. In an extensible draft arm assembly of a tractor three-point hitch comprising, a lower draft arm assembly including a draft arm adapted for connection to a tractor and an extension link telescoping within the draft arm, the improvement comprising hook means on the end of said extension link defining a latch engaging surface, a latch on said draft arm for latching said extension link in a contracted position on said draft arm including a latch housing connected to said draft arm, a latch element pivoting about an axis normal to said draft arm, a latch handle connected to said latch element, resilient means selectively and alternatively positioned for resiliently biasing said latch element to a latched position engaging said hook means of said extension link and for retaining said latch in an unlatched position.

2. In an extensible draft arm assembly of a tractor three-point hitch as set forth in claim 1 wherein said latch element includes an integral handle, a latching portion for engaging said hook means integral with said latch element.

3. In an extensible draft arm assembly of a tractor three-point hitch as set forth in claim 1 wherein said latch element includes a rest portion for engaging a portion of said lower draft arm when said extension link is in the extended portion.

4. In an extensible draft arm assembly of a tractor three-point hitch as set forth in claim 1 wherein said resilient means includes a coil spring selectively biasing said latch element to a latched position and an unlatched position.

5. In an extensible draft arm assembly of a tractor three-point hitch as set forth in claim 1 wherein said resilient means includes a spring, means defiing a lateral biasing portion of said spring to engage said latch element for retaining said latch in an unlatched position.

6. In an extensible draft arm assembly of a tractor three-point hitch as set forth in claim 1 wherein said resilient means includes a spring defining an upper stop for said latch element when said latch is in the unlatched position.

7. In an extensible draft arm assembly of a tractor three-point hitch as set forth in claim 1 including a pin pivotally supported in said latch housing and pivotally supporting said latch element, said resilient means includes a coil spring mounted on said pin for selectively biasing said latch element into a latched position and retaining said latch element in an unlatched position.

8. In an extensible draft arm assembly of a tractor three-point hitch as set forth in claim 1 wherein said resilient means includes a spring, means defining spring ends extending forwardly and biasing said latch element in a latched position, means adapted for selectively removing the ends of said spring for biasing said latch element transversely to maintain said latch element in an unlatched position.

9. In an extensible draft arm assembly of a tractor three-point hitch as set forth in claim 1 including a pin pivotally mounted in said latch housing, said resilient means includes a spring mounted on said pin, means defining spring ends for selectively biasing said latch element downwardly into a latched position and selectively biasing said latch element transversely in an unlatched position.

10. In an extensible draft arm assembly of a tractor three-point hitch as set forth in claim 1 wherein said latch housing defines an opening for receiving a portion of said latch element, a pin mounted in said housing for pivotally supporting said latch element, a latching portion on said latch element positioned below the axis of said pin to engage said hook means on said extension link for biasing said latch in a latched position responsive to a draft force and said extension link for extending said link relative to said lower draft arm.

* * * * *